United States Patent
Smith et al.

(10) Patent No.: US 6,299,399 B1
(45) Date of Patent: Oct. 9, 2001

(54) HIGH PULLING FORCE FASTENER WITH BOWABLE HEAD

(75) Inventors: Michael Walter Smith, Lake Zurich; Joseph William Lowry, Liberty; Michael Anthony Giugliano, Des Plaines, all of IL (US)

(73) Assignee: WTPA, Incorporated, Newark, DE (US)

( * ) Notice: Subject to any disclaimer, the term of this patent is extended or adjusted under 35 U.S.C. 154(b) by 0 days.

(21) Appl. No.: 09/618,191

(22) Filed: Jul. 18, 2000

Related U.S. Application Data

(60) Provisional application No. 60/175,651, filed on Jan. 12, 2000.

(51) Int. Cl.[7] ............................. F16B 13/06; F16B 37/04
(52) U.S. Cl. .......................... 411/61; 411/55; 411/173; 411/183
(58) Field of Search ........................ 411/55, 61, 60.2, 411/173, 182, 30, 31, 508, 183

(56) References Cited

U.S. PATENT DOCUMENTS

| | | |
|---|---|---|
| 4,500,238 | 2/1985 | Vassiliou ............................... 411/30 |
| 4,765,788 | 8/1988 | Nowak et al. ......................... 411/61 |
| 4,874,277 | 10/1989 | Nowak et al. ......................... 411/61 |
| 4,941,340 | 7/1990 | Nowak et al. ..................... 72/379.2 |
| 5,100,273 | 3/1992 | Vassiliou ............................... 411/60 |
| 5,429,467 | * 7/1995 | Gugle et al. ..................... 411/508 X |
| 5,725,343 | 3/1998 | Smith ................................... 411/55 |

* cited by examiner

Primary Examiner—Neill Wilson
(74) Attorney, Agent, or Firm—E. Vassiliou

(57) ABSTRACT

This invention relates to a fastener, which expands by the insertion of an expanding member, preferably a screw through an engageable hole of the fastener. The fastener comprises a substantially flat head and two expandable legs. The head has an upper side and a lower side, preferably separated by a gap. The fastener has a hardness within a range which improves considerably the pulling force and allows the head of the fastener to be bowable upon applying said force on the expanding member, thus resulting in a gradual rather than abrupt failure. The engageable hole may be round or oblong. Additional engagement may be provided at lower portions of the fastener for improving pulling force and/or prevailing torque. Further, an elastic body may be integrally molded at least at the lower side of the head of the fastener, and preferably throughout the head of the fastener.

26 Claims, 3 Drawing Sheets

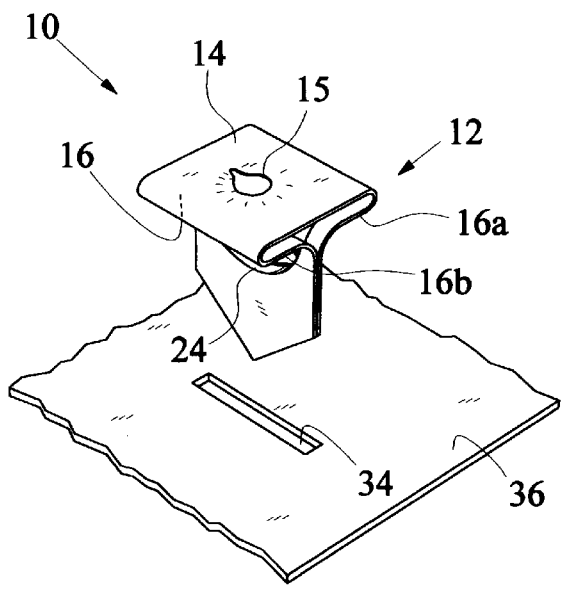
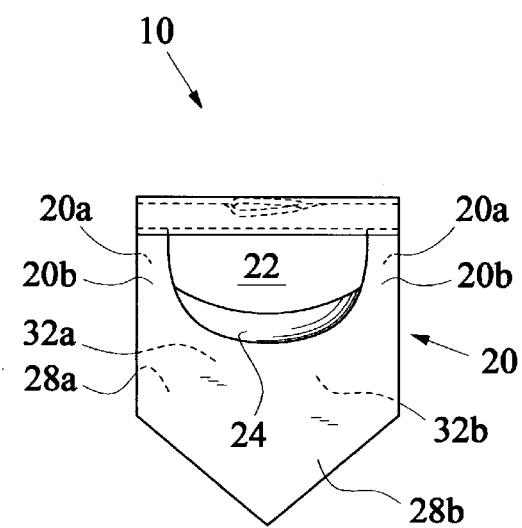
FIG. 1
FIG. 2
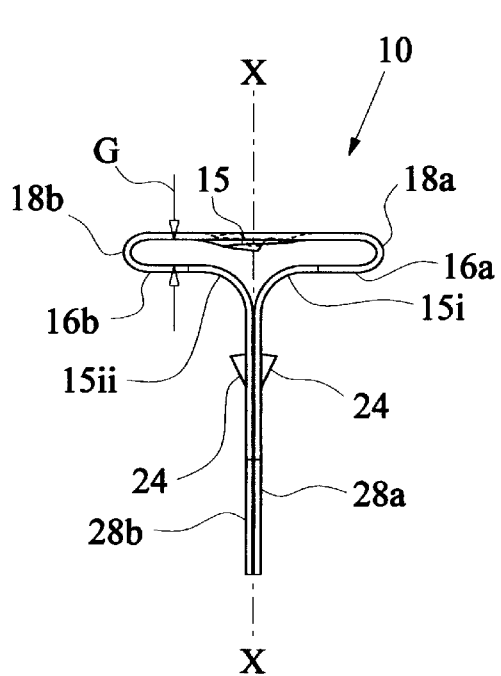
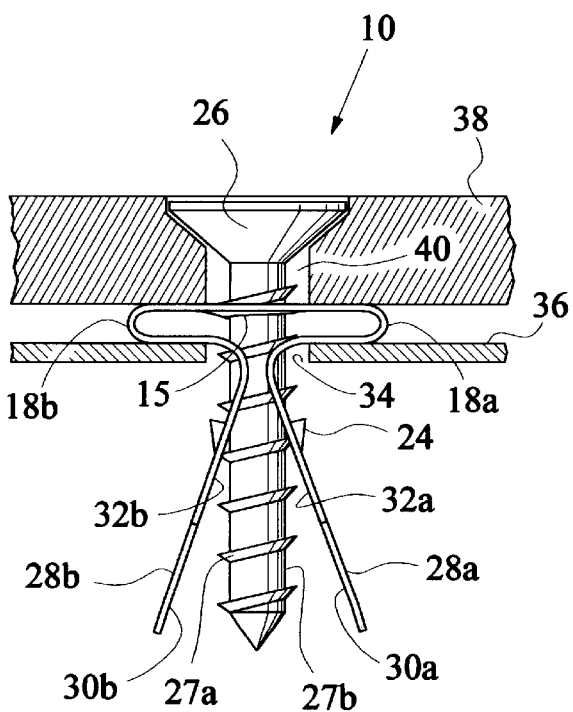
FIG. 3
FIG. 4

HIGH PULLING FORCE FASTENER WITH BOWABLE HEAD

RELATED APPLICATIONS

This application claims priority of provisional patent application 60/175,651, filed on Jan. 12, 2000, which is incorporated herein by reference in its entirety.

FIELD OF THE INVENTION

This invention pertains fasteners, and more particularly fasteners which have expandable legs and which attach one object to another object.

BACKGROUND OF THE INVENTION

In the original conventional technology of fasteners employed to securely attach one object to another, such as for example one part to another in the case of an automobile or an appliance, has utilized a nut on one of the two objects, usually welded or glued to the back of said object, and a bolt passing through a hole on the second object in a manner to be engaged by the nut, thereby securing the two objects together.

This arrangement presents many problems, among which, one of the most important is that in the case that one object is hollow, the nut has to be in place at the back of the hollow object before assembling the two objects together. If for any reason the nut is misplaced, and/or if it becomes desirable to introduce a new fastening connection between the two objects, the task of achieving such connection becomes very difficult if not impossible for all practical purposes.

The so-called "quick nuts" have also been used to connect two objects. In addition, vibration during the operation of a device, such as an automobile or appliance for example, containing the two objects results very often in loosening of the bolt or "quick nut" and in either full disassembling of the objects from each other, or in a vibration noise which is most annoying and often of unacceptable levels. Further, such connections are not water-resistant and water may be easily penetrate the connection point and be transferred from one side of one or both objects to the other side.

Recently, fasteners of the type described in U.S. Pat. No. 4,500,238 (Vassiliou) have been utilized to reduce considerably the potential of bolt or screw loosening and vibration. They have also eliminated the problem of having to place one member of the fastener at the back portion of the hollow object. These fasteners are placed through a slot from the front part of the hollow object. An expanding member, being usually a bolt or a screw, supports the second object by forcing the legs of the fastener (as described for example in U.S. Pat. No. 4,500,238) to open or expand, thereby securing the two objects together. The fasteners of this type have greatly improved the prevailing torque (as defined hereinbelow), as well as the pulling force (as also defined hereinbelow) of the system. The legs of the fastener are supported by a head having an upper side and a lower side joined by side bents.

In the fasteners of the above type, when an increasingly higher force is applied on the screw to pull it away from the fastener, there is reached a value of the force (pulling force) at which failure (separation of the expanding member from the fastener or breaking a part of the fastener) occurs. The failure usually occurs at the side bents which join the upper side of the head of the fastener with the lower side. This failure is quite abrupt as the head of the fastener splits all of a sudden.

One major object of the instant invention is to provide fasteners which are characterized by highly increased pulling force combined with more gradual failure, among other advantages.

SUMMARY OF THE INVENTION

In the text describing and claiming the instant invention, the following comments and definitions are appropriate:

The expanding member is preferably a screw having threads and a root on which the threads are supported.

Prevailing torque is the torque required to render a screw loose.

Pulling force is the pulling force applied on the screw to the point of failure (usually failure occurs an the side bents that join the upper side of the head and the lower side of the head).

Critical hardness regarding fasteners of the instant invention is a hardness at or over which failure occurs without substantial permanent bowing of the head of the fastener, while under which hardness failure occurs with substantial permanent bowing of the head of the fastener.

Engageable hole or region is an at least partial hole or region which can be engaged with a screw, or similar element.

Pitch of a screw is defined as the distance between two consecutive threads of the screw.

Gap in the vicinity of a bent is equal to the diameter of a circle with the same radius as the radius of curvature of the inside portion of the bent, as illustrated in FIG. 7, and explained in more detail hereunder.

This invention pertains a sheet metal fastener, the sheet metal fastener having a first hardness and characterized by a critical hardness higher than the first hardness, the sheet metal fastener comprising:

(a) a substantially flat head portion having an upper side, and a lower side, the two sides joined through side bents and being separated by a gap, the upper side having a first hole engageable to an expanding member;

(b) a neck having an opening and two side neck portions, the neck extending from the lower side of the substantially flat head portion at a substantially right angle with respect to the substantially flat head portion; and (c) two substantially flat legs extending from the neck, each leg having an inner surface, the two inner surfaces of the two legs being at an initial proximity with each other, the legs having a funnel configuration at a region where the legs start extending from the neck, the legs being expandable in opposite directions upon engaging to the first hole and inserting into the funnel configuration the expansion member;

the first hardness being adequately low to allow the head to permanently bow upon application of a pulling force to failure on the expanding member away from the fastener, but not lower than a hardness at which the force to failure is lower than a force to failure of the same fastener having the critical hardness.

The instant invention also pertains a vehicle comprising two parts connected with a sheet metal fastener, the sheet metal fastener having a first hardness and characterized by a critical hardness higher than the first hardness, the sheet metal fastener comprising:

(a) a substantially flat head portion having an upper side, and a lower side, the two sides joined through side bents and being separated by a gap, the upper side having a first hole engageable to an expanding member;

(b) a neck having an opening and two side neck portions, the neck extending from the lower side of the substantially flat head portion at a substantially right angle with respect to the substantially flat head portion; and (c) two substantially flat legs extending from the neck, each leg having an inner surface, the two inner surfaces of the two legs being at an initial proximity with each other, the legs having a funnel configuration at a region where the legs start extending from the neck, the legs being expandable in opposite directions upon engaging to the first hole and inserting into the funnel configuration the expansion member;

the first hardness being adequately low to allow the head to permanently bow upon application of a pulling force to failure on the expanding member away from the fastener, but not lower than a hardness at which the force to failure is lower than a force to failure of the same fastener having the critical hardness.

It is preferable that the first hardness is in the range of 32 to 37 in the Rockwell C scale, and/or the critical hardness is in the range of 40 to 45 in the Rockwell C scale.

The sheet metal has preferably a thickness in the range of 0.2 to 1.2 mm, and it is highly preferable that the gap in the vicinity of the bents is greater than the thickness of the sheet metal.

The first engageable hole may have a round or an oblong shape. Fasteners having a round hole are well known to the art. Fasteners having a hole with an oblong shape are described in the provisional application of Joseph W. Lowry and Eustathios Vassiliou, titled "Extensive Engagement Fastener", Ser. No. 60/171,544, filed on Dec. 22, 1999, which provisional application is incorporated herein by reference.

The expanding member may comprise threads, a root, and a pitch, and the first edge and the second edge may be preferably separated by a distance corresponding to the pitch of the expanding member.

When water-proofing, and/or gas-proofing are desired for a particular application, and/or vibration noises are to be prevented, an elastic body is preferably integrally molded at least at the lower side of the substantially flat head portion. Such elastic bodies are for example disclosed in U.S. Pat. No. 5,725,343 (Smith), in the provisional application of Kanubhai Manibhai Patel, Michael Walter Smith and Edward John Smith, titled "High Performance Sealing Fastener", having a Ser. No. 60/170,112, and filed on Dec. 10, 1999, which provisional application is incorporated herein by reference, and U.S. patent application Ser. No. 09/561,505, filed Apr. 28, 2000, which is also incorporated herein by reference.

The portion of the fastener under the upper side of the head may comprise an element engageable to the expanding member. Such engageable elements are described in provisional applications 60/167,080 (Vassiliou), filed Nov. 23, 1999, 60/169,477 (Vassiliou), filed Dec. 7, 1999, 60/170,611, filed on Dec. 14, 1999, and 60/179,834, filed Feb. 2, 2000, all four of which provisional applications are incorporated herein by reference.

BRIEF DESCRIPTION OF THE DRAWING

The reader's understanding of this invention will be enhanced by reference to the following detailed description taken in combination with the drawing figures, wherein:

FIG. 1 is a perspective view of a fastener according to a preferred embodiment of this invention, and a panel with a slot, on which panel the fastener is intended to fasten another object.

FIG. 2 is a front view of the type of the fastener illustrated in FIG. 1.

FIG. 3 is a side view of the type of the fastener illustrated in FIG. 1, and wherein the gap between the upper side and the lower side of the head is uniform.

FIG. 4 is a cross-sectional side view of the fastener illustrated in FIG. 1 connecting two objects or panels after the legs of the fastener have been expanded by a screw.

DETAILED DESCRIPTION OF THE INVENTION

Figure 5:
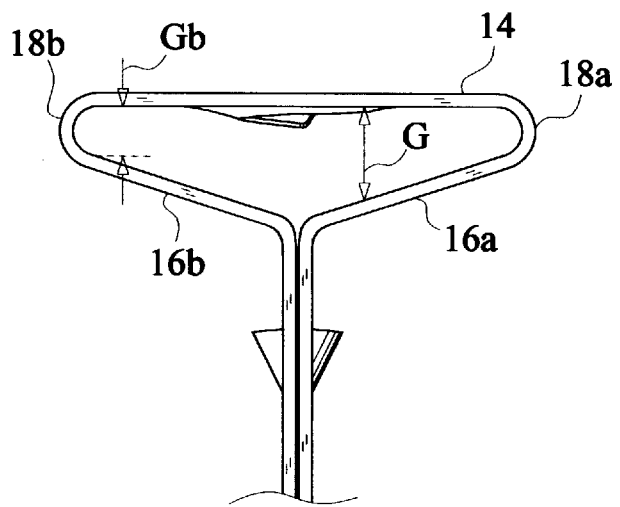
FIG. 5 is a fragmental cross-sectional side view of a fastener according to another preferred embodiment of the instant invention, wherein the gap between the upper side and the lower side of the head is smaller in the vicinity of the bents than in locations further away from said vicinity.

This invention pertains expanding fasteners which can secure two or more objects together. An example is two automobile parts, such as a plastic panel and a metal sheet, for example, secured together. The invention also pertains vehicles comprising parts connected with the novel fasteners described herein. The fasteners of this invention differ drastically from the fasteners known to the art in that they present highly improved pulling force to failure combined with gradual rather than abrupt failure, as it will be explained in detail hereinbelow.

Referring now to FIGS. 1 to 10, there is depicted a sheet metal fastener 10, similar to the fasteners described in U.S. Pat. No. 4,500,238, comprising a substantially flat head portion 12. The substantially flat head portion 12 has an upper side 14, and a lower side 16.

The upper side 14 has a first engageable hole 15, which hole has a first axis X—X. The first axis X—X is substantially perpendicular to the substantially flat head portion 12.

The lower side 16 comprises a right lower side 16a and a left lower side 16b.

The upper side 14 and the lower side 16 may be separated by a gap G as better shown in FIG. 3, or they may be substantially in contact (not shown for purposes of clarity) with each other, depending on the application. The upper side 14 is connected to the right lower side 16a and the lower left side 16b through a right side bent 18a and a left side bent 18b, respectively (collectively side bents 18).

Figure 6:
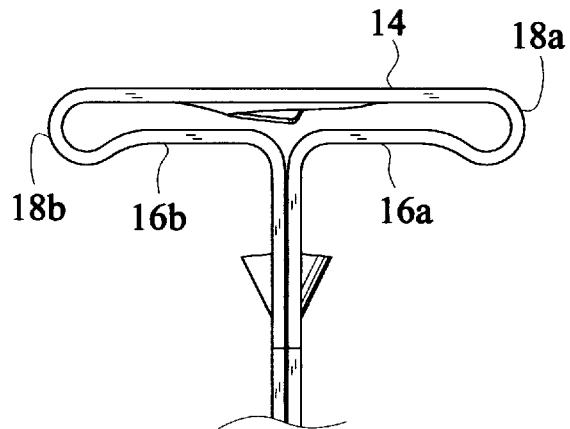
FIG. 6 is a fragmental cross-sectional side view of a fastener according to another preferred embodiment of the instant invention, wherein the gap between the upper side and the lower side of the head is larger in the vicinity of the bents than in locations further away from said vicinity.

The gap G may be uniform as shown clearly in FIGS. 1–4 and 8, or it may be smaller in the vicinity of side bents 18 than in the rest of the locations, as better shown in FIG. 5, or it may be larger in the vicinity of the side bents 18, as better shown in FIG. 6.

Figure 7:
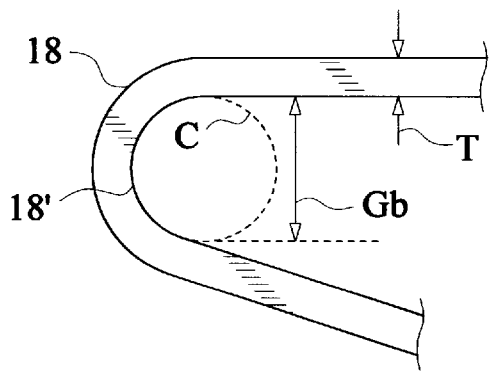
FIG. 7 is a fragmental cross sectional view showing the vicinity of a side bent of the head of a fastener according to the instant invention.
Figure 8:
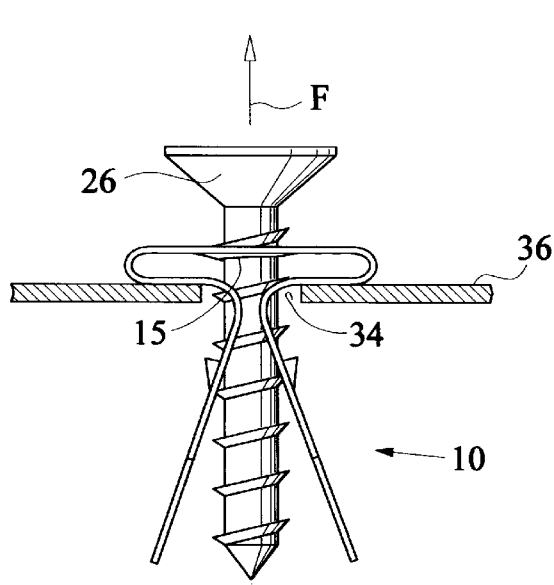
FIG. 8 is a cross sectional view of a fastener expanded by a screw before any pulling force has been applied to said screw.

As aforementioned, the gap Gb in the vicinity of the side bents 18, as better illustrated in FIG. 7 is equal to the diameter of a circle C which circle C has the same radius as the radius of curvature of the inside portion 18b' of the bents 18, as illustrated in FIG. 7, and explained in more detail hereunder. If for some reason, the inside portions of the two bents have different values, the same criteria will apply individually to the gap corresponding to the vicinity of each side bent.

The larger the gap Gb the larger the radius of curvature of the two bents, and therefore, the higher the pulling force which is needed to break the hardened fastener at the bent regions. However, there are occasions when a small gap or substantial absence of a gap is necessary due to space requirements. Nevertheless, it is highly preferable that the gap Gb in the vicinity of the bents 18 is larger than the thickness T of the sheet metal (see FIG. 7). As aforementioned, the thickness T of the sheet metal is preferably in the range of 0.2 to 1.2 mm.

The fastener 10 further comprises a neck 20 having a cutting or opening 22 and two side neck portions 20a. The neck 20 extends from the lower side 16 of the head portion 12 at a substantially right angle in its length with respect to the substantially flat head portion 12 of the fastener 10.

The fastener 10 also comprises two substantially flat legs, a right leg 28a and a left leg 28b, extending from the neck 20, and having inner surfaces 30a and 30b, respectively, the two inner surfaces 30a and 30b of the two legs 28a and 28b being at an initial proximity with each other, the legs being expandable in opposite directions upon inserting through and engaging to the first engageable hole an expansion member, such as screw 26 having threads 27a and a root 27b, thus bringing the expansion member to a contact region 32a on leg 28a and a contact region 32b on leg 28b.

At the bottom of the opening 22 there is disposed a funnel 24 for guiding an expansion member, such as a screw 26 (see FIG. 4), for example. The funnel 24 is preferably coaxial with the hole 15. The funnel 24 may be considered as part of the legs 28a and 28b.

The opening 22 may have any appropriate dimensions. For example, it may have a general round shape as shown in FIG. 2, or it may be elongated, or it may be just a thin slit parallel to the plane of and adjacent to the substantially flat head portion 12. In the case that it is just a thin slit adjacent to the substantially flat head portion 12, the funnel 24 will also be adjacent to the substantially flat head portion 12, and the two side neck portions 20a will be minuscule in length from the lower side 16 to the beginning of the legs in the vicinity of the funnel 24.

The sheet metal fastener 10 of this invention may be typically formed by stamping, forming, and heat treating so that the fastener attains a hardness within a desirable range. Stamping, forming, and heat treating sheet metal objects are methods well known to the art and are well controllable.

The desirable hardness range within which an individual fastener of the present invention may be found without any difficulty by determining (a) the lowest hardness at which permanent bowing does not occur when an increasing force to failure F (pulling force) is applied on the expanding member 26 pulling said expanding member 26 away from the fastener 10. The hardness at this point represents the critical hardness, which is the upper limit (not included) of hardness in the range of hardness of this invention, and (b) the lowest hardness at which bowing takes place and at the same time the force to failure is larger than the pulling force of case (a). This hardness represents the low limit (included) of hardness in the range of hardness of this invention.

It was very unexpected to find out that the pulling force in the range of hardness of this invention is higher than in any other range of hardness.

It is preferable, as already mentioned, that the first hardness is in the range of 32 to 37 in the Rockwell C scale, and/or the critical hardness is in the range of 40 to 45 in the Rockwell C scale.

In operation, the fastener 10, having a hardness within the hardness range of the instant invention (first hardness), is inserted through to slot 34 of a sheet, preferably metal sheet 36. In sequence, a panel 38 is placed on top having a panel hole 40. An expanding body, preferably a screw, is then inserted through the panel hole 40, engages to the engageable hole 15 of the fastener, and expands the legs 28a and 28b by applying force at the contact region 32a and 32b.

When a force F is applied on the expanding member 26 tending to separate the panel 38 (FIG. 4) from the metal sheet 36, the head 12 bows permanently (FIG. 10) and the pulling force (force at failure) is definitely increased as compared to a pulling force of the same fastener having a hardness outside the range of the instant invention. The pulling force within the range of hardness of the instant invention may be even higher than double of the pulling force at the critical hardness of the fastener under consideration. This is an outstanding improvement provided by the instant invention.

Further, the gradual failure observed in the case of fasteners of the instant invention as compared to abrupt failure of the fasteners known to the art, is of extreme importance, since it gives ample warning of the forthcoming complete failure.

In the range of hardness according to this invention, the failure usually occurs at the side bents 18a and/or 18b, if the hardness of the fastener under consideration is close to the upper limit (critical hardness) of said range, while the failure usually occurs at the first engagement hole (stripping) if the hardness of said fastener is close to the low limit as defined above.

Figure 9:
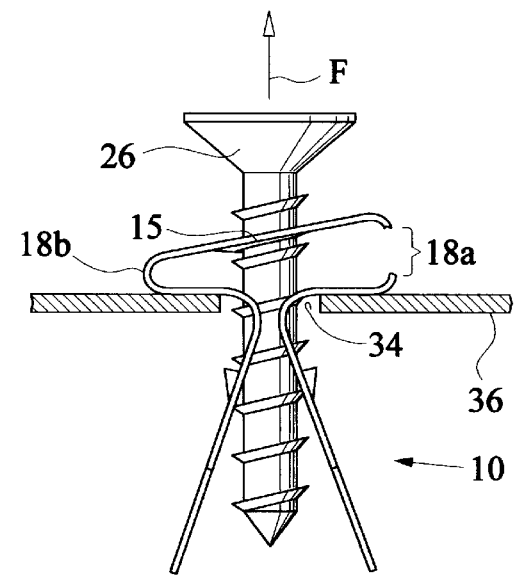
FIG. 9 is a cross-sectional side view of a fastener just after failure due to a pulling force having been applied to said screw, lacking substantial permanent bowing of the head of the fastener before and after said failure.
Figure 10:
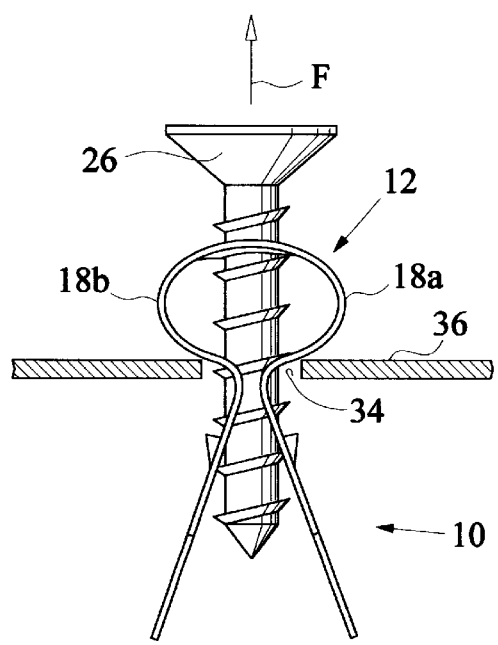
FIG. 10 is a cross-sectional side view of a fastener according to the instant invention illustrating permanent bowing just before failure due to a pulling force applied to the screw.

Above the critical hardness, failure usually occurs at the side bent vicinity, as illustrated for example in FIG. 9, at a pulling force value lower than that of the same fastener having a hardness within the range of hardness of the present invention.

In another embodiment of the instant invention, the portion of the fastener under the upper side of the head may comprise an element engageable to the expanding member. Such engageable elements are described in provisional applications 60/167,080 (Vassiliou), filed Nov. 23 1999, 60/169,477 (Vassiliou), filed Dec. 7, 1999, 60/170,611, filed on Dec. 14, 1999, and 60/179,834, filed Feb. 2, 2000, all four of which provisional applications are incorporated herein by reference.

The operation of this embodiment, wherein there are engageable elements in portions of the fastener at location(s) under the upper side 14 of the head 15, is substantially the same as the operation of the embodiment already described with the difference that at least one additional, preferably positive, engagement takes place, providing advantages such as further improved pulling force and/or prevailing torque as explained in detail in the applications which have been incorporated herein by reference.

According to another embodiment of the present invention, n elastic body is integrally molded at least at the lower side of the substantially flat head portion. Such elastic bodies are for example disclosed in U.S. Pat. No. 5,725,343 (Smith), and in the provisional application of Kanubhai Manibhai Patel, Michael Walter Smith and Edward John Smith, titled "High Performance Sealing Fastener", having a Ser. No. 60/170,112, and filed on Dec. 10, 1999, and which provisional application is incorporated herein by reference.

Figure 11:
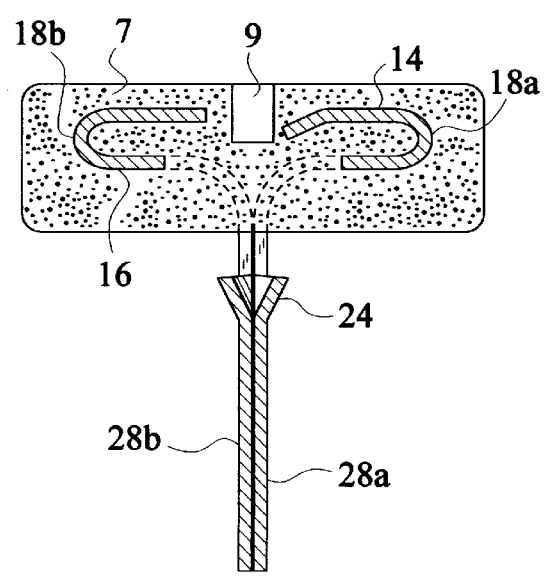
FIG. 11 is a cross-sectional side view of a fastener according to another embodiment of the instant invention, wherein the an elastic body is integrally molded to the head of the fastener.

An example of such a configuration is illustrated in FIG. 11, wherein an elastic body 7, having preferably a depression or guiding hole 9, is integrally molded around the head of the fastener of the instant invention.

The operation of this embodiment is substantially the same as the operation of the previous embodiments, with the difference that water-proofing, gas-proofing, and vibration noises are prevented, as better explained in the above incorporated references.

In still another embodiment of the instant invention, the first engageable hole may be oblong. Fasteners having a hole with an oblong shape are described in the provisional application of Joseph W. Lowry and Eustathios Vassiliou, titled "Extensive Engagement Fastener", Ser. No. 60/171,544, filed on Dec. 22, 1999, which provisional application is incorporated herein by reference.

The operation of this embodiment is substantially the same as the operation of the previous embodiments, with the difference that it is easier to locate the engageable hole even if the fastener is applied in difficult to reach positions, as better explained in the above incorporated reference.

One or more of the above embodiments may be exercised simultaneously.

The embodiments described hereinabove serve illustration purposes only regarding this invention, which should only be bound by the claims.

Any explanations given are speculative and should not restrict the scope of the claims.

What is claimed is:

1. A sheet metal fastener, the sheet metal fastener having a first hardness and characterized by a critical hardness higher than the first hardness, the sheet metal fastener comprising:
   (a) a substantially flat head portion having an upper side, and a lower side, the two sides joined through side bents and being separated by a gap, the upper side having a first hole engageable to an expanding member;
   (b) a neck having an opening and two side neck portions, the neck extending from the lower side of the substantially flat head portion at a substantially right angle with respect to the substantially flat head portion; and
   (c) two substantially flat legs extending from the neck, each leg having an inner surface, the two inner surfaces of the two legs being at an initial proximity with each other, the legs having a funnel configuration at a region where the legs start extending from the neck, the legs being expandable in opposite directions upon engaging to the first hole and inserting into the funnel configuration the expansion member;
   the first hardness being adequately low to allow the head to permanently bow upon application of a pulling force to failure on the expanding member away from the fastener, but not lower than a hardness at which the force to failure is lower than a force to failure of the same fastener having the critical hardness.

2. A fastener as defined in claim 1, wherein the first hardness is in the range of 32 to 37 in the Rockwell C scale.

3. A fastener as defined in claim 1, wherein the critical hardness is in the range of 40 to 45 in the Rockwell C scale.

4. A fastener as defined in claim 2, wherein the critical hardness is in the range of 40 to 45 in the Rockwell C scale.

5. A fastener as defined in claim 1, wherein the sheet metal has a thickness in the range of 0.2 to 1.2 mm, and the gap in the vicinity of the bents is greater than the thickness of the sheet metal.

6. A fastener as defined in claim 4, wherein the sheet metal has a thickness in the range of 0.2 to 1.2 mm, and the gap in the vicinity of the bents is greater than the thickness of the sheet metal.

7. A fastener as defined in claim 1, wherein the first engageable hole has an oblong shape, and/or a portion of the fastener under the head has an element engageable to the expanding member.

8. A fastener as defined in claim 4, wherein the first engageable hole has an oblong shape, and/or a portion of the fastener under the head has an element engageable to the expanding member.

9. A fastener as defined in claim 6, wherein the first engageable hole has an oblong shape, and/or a portion of the fastener under the head has an element engageable to the expanding member.

10. A fastener as defined in claim 1, further comprising an elastic body integrally molded at least at the lower side of the head.

11. A fastener as defined in claim 4, further comprising an elastic body integrally molded at least at the lower side of the head.

12. A fastener as defined in claim 6, further comprising an elastic body integrally molded at least at the lower side of the head.

13. A fastener as defined in claim 8, further comprising an elastic body integrally molded at least at the lower side of the head.

14. A vehicle comprising two parts connected with a sheet metal fastener, the sheet metal fastener having a first hardness and characterized by a critical hardness higher than the first hardness, the sheet metal fastener comprising:
   (a) a substantially flat head portion having an upper side, and a lower side, the two sides joined through side bents and being separated by a gap, the upper side having a first hole engageable to an expanding member;
   (b) a neck having an opening and two side neck portions, the neck extending from the lower side of the substantially flat head portion at a substantially right angle with respect to the substantially flat head portion; and
   (c) two substantially flat legs extending from the neck, each leg having an inner surface, the two inner surfaces of the two legs being at an initial proximity with each other, the legs having a funnel configuration at a region where the legs start extending from the neck, the legs being expandable in opposite directions upon engaging to the first hole and inserting into the funnel configuration the expansion member;
   the first hardness being adequately low to allow the head to permanently bow upon application of a pulling force to failure on the expanding member away from the fastener, but not lower than a hardness at which the force to failure is lower than a force to failure of the same fastener having the critical hardness; and
   wherein one of the two parts comprises a slot for accepting the substantially flat legs of the fastener, and the other part comprises a hole for accepting the expanding member.

16. A vehicle as defined in claim 14, wherein the first hardness is in the range of 32 to 37 in the Rockwell C scale.

16. A vehicle as defined in claim 14, wherein the critical hardness is in the range of 40 to 45 in the Rockwell C scale.

17. A vehicle as defined in claim 15, wherein the critical hardness is in the range of 40 to 45 in the Rockwell C scale.

18. A vehicle as defined in claim 14, wherein the sheet metal has a thickness in the range of 0.2 to 1.2 mm, and the gap in the vicinity of the bents is greater than the thickness of the sheet metal.

19. A vehicle as defined in claim 17, wherein the sheet metal has a thickness in the range of 0.2 to 1.2 mm, and the gap in the vicinity of the bents is greater than the thickness of the sheet metal.

20. A vehicle as defined in claim 14, wherein the first engageable hole has an oblong shape, and/or a portion of the fastener under the head has an element engageable to the expanding member.

21. A vehicle as defined in claim 17, wherein the first engageable hole has an oblong shape, and/or a portion of the fastener under the head has an element engageable to the expanding member.

22. A vehicle as defined in claim 19, wherein the first engageable hole has an oblong shape, and/or a portion of the fastener under the head has an element engageable to the expanding member.

23. A vehicle as defined in claim 14, further comprising an elastic body integrally molded at least at the lower side of the head.

24. A vehicle as defined in claim 17, further comprising an elastic body integrally molded at least at the lower side of the head.

25. A vehicle as defined in claim 19, further comprising an elastic body integrally molded at least at the lower side of the head.

26. A vehicle as defined in claim 21, further comprising an elastic body integrally molded at least at the lower side of the head.

* * * * *